Feb. 4, 1964   F. WALLENBERG ETAL   3,120,299
ADJUSTABLE FLUID CLUTCH
Filed March 20, 1961   2 Sheets-Sheet 1

INVENTORS
FRITZ WALLENBERG
WILBUR G. HILL
BY
ATTORNEYS

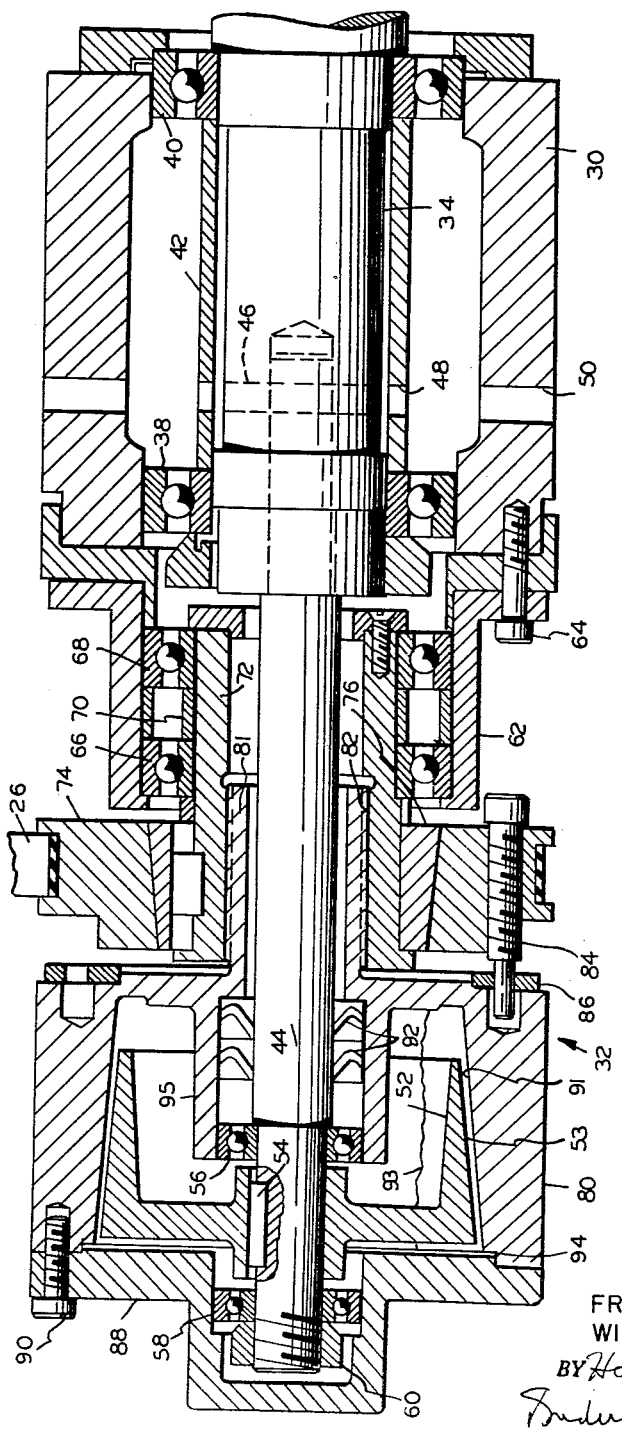

3,120,299
ADJUSTABLE FLUID CLUTCH
Fritz Wallenberg, Binghamton, and Wilbur G. Hill, Port Dickinson, N.Y., assignors to General Aniline & Film Corporation, New York, N.Y., a corporation of Delaware
Filed Mar. 20, 1961, Ser. No. 96,911
3 Claims. (Cl. 192—58)

This invention relates to improvements in fluid clutches and, more particularly, relates to an adjustable torque fluid clutch.

Clutches employing a hydraulic liquid as a fluid coupling are well known. Such clutches provide a smooth drive and tend to eliminate any irregularities in power transmission. Also, fluid clutches are adaptable for a number of types of power transmissions, one of these types being the transmission of power to a film web drive.

In the common type of fluid clutch a driving member and driven member are separated and a clutch fluid is placed therebetween to transmit the torque between the driving member and the driven member. The torque transmitted depends upon the configuration and spacing of the driving member and the driven member, the viscosity and amount of clutch fluid and the speed and power applied to the driving member. The torque a fluid clutch will transmit may be determined if all of these parameters are known. Therefore with a constant space between the driving member and driven member, constant amount of clutch fluid and constant input power, there will be a smooth output torque which is also constant. However, in many applications of a fluid clutch it is highly desirable to provide adjustable means for varying the output torque capacity other than by varying the input speed. In other words, it is desirable to vary the torque capacity of the clutch without changing the input speed or power or by using a different type of clutch fluid such as oil with a different viscosity.

This invention provides a fluid clutch in which the torque capacity is adjustable by adjusting the clearance between the driven and driving members of the clutch. In accordance with this invention the driving and driven members which transmit the power are complementary and are tapered and positioned adjacent one another so that when moved axially the clearance between the tapered portions may be varied. By means of such axial movement and varying clearance between the tapered portions of the driving and driven member, the torque capacity of the clutch may be varied even though the input speed and the clutch fluid remain the same.

Other objects and advantages will be apparent from the following description of the invention, pointed out in particularity in the appended claims, and taken in connection with the accompanying drawings, in which:

FIG. 2 is a sectional elevational view taken through the adjustable fluid clutch of this invention showing the details thereof.

Figure 1:
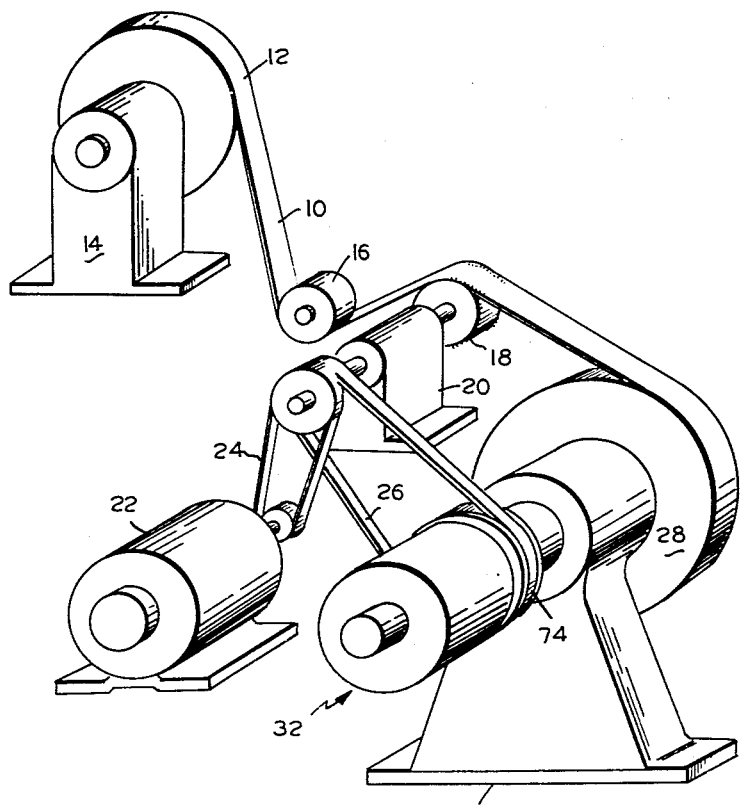
FIG. 1 is a schematic perspective view of one particular application of the adjustable fluid clutch of this invention.

Referring to FIG. 1, a system for driving a web 10 is illustrated. The web 10, which may have perforations along both edges thereof and may be either film or paper, is unwound from a roll 12 supported on an unwind stand 14. A braking torque may be applied by mechanical means (not shown). After passing over suitable idler rolls such as idler 16, the web 10 passes to a feed sprocket 18 which in turn is attached to a shaft supported from a bearing containing feed sprocket support 20. The feed sprocket 18 is driven at a constant speed from electric drive motor 22 through the belt 24 engaging the pulley 19. Another belt 26 driven from the pulley 19 supplies a constant speed input to an adjustable fluid clutch 32 connected to a windup spindle for winding the web 10 on windup roll 28. The windup roll 28 and clutch assembly are supported on a suitable stand 30.

By this arrangement the motor 22 drives the outer shell of the adjustable fluid clutch 32 at a substantially constant speed. The fluid clutch is filled with a suitable liquid power transfer medium such as silicone oil and provides a viscous coupling with a driven member within the shell. By the configuration of the driving and driven members the gap therebetween may be adjusted so as to vary the torque of the clutch. This is seen in the detailed view of the clutch in FIG. 2.

As shown in FIG. 2, the windup spindle 34 which is to be attached to the windup roll, is journaled in the windup stand 30 by means of suitable ball bearings 38 and 40 separated by a spacer 42. The shaft 44 of the driven member is rigidly attached to the windup spindle 34 by means of a pin 46 or the like. Access to the pin 46 for disassembling the adjustable clutch 32 from the windup stand 30 may be had through holes 48 and 50 in bearing spacer 42 and windup stand 30, respectively.

Adjacent one end of the shaft 44 is mounted the rotor 52 which has a conically tapered outer surface 53. Tapered rotor 52 is rigidly secured to the shaft 44 by key 54 or the like. Shaft 44 is provided with support bearings on both sides of the rotor 52 such as ball bearings 56 and 58. The assembly of the bearings 56, 58 and rotor 52 is secured to a reduced section of shaft 44 by a threaded nut 60.

A bearing housing 62 provides a cylindrical extending flange from windup stand 30 and is rigidly secured thereto by screws 64. The bearing housing 62 includes ball bearings 66 and 68 separated by spacer 70 for journaling a sleeve 72 rotatably therein. Sleeve 72 is driven at constant speed from belt 26 which is trained around a pulley 74, which in turn is secured to sleeve 72 by a tapered locking collar 76 keyed thereto by a suitable key 78.

The adjustable fluid clutch 32 also includes an outer shell member 80 having an extending neck 81 with fine threads on the outside thereof mating with fine threads on the inside of sleeve 72 providing an adjustable threaded connection 82. A bolt 84 threaded through pulley 74 extends through a selected hole of an index plate 86 rigidly secured to shell 80 and into a hole in the shell. Index plate 86 has several index holes equally spaced about the periphery so that the position of the driving pulley 74 relative to the shell 80 may be adjustably determined. The bolt 84, cooperating with the index plate 86 and shell 80, provides the driving connection between the pulley 74 and the outer shell 80. The latter is provided with an end cover 88 secured thereto by screws 90 with a sealing gasket 94 therebetween.

The space enclosed within the outer shell 80 is defined by the tapered inner surface 91 of this shell which is complementary to the taper 53 of the outer surface of rotor 52. The space enclosed within the outer shell 80 is filled to a suitable level with a viscous fluid 93 such as silicone oil. To prevent leakage of the clutch fluid oil seals 92 are provided surrounding the shaft 44 and cooperating with an inner extension 95 of the outer shell 80.

In operation, a constant speed drive is applied from motor 22 through belt 26 to the pulley 74. The driving torque is transmitted from pulley 74 through driving bolt 84 to adjustable index plate 86 and outer shell 80. With outer shell 80 rotating and fluid 93 contained therein, a viscous coupling will be established between the outer shell 80 and the rotor 52 through the narrow peripheral gap between tapered surfaces 53 and 91 of the rotor 52 and shell 80, respectively. The torque transmitted by the clutch, assuming a constant input speed from the belt 26 and a constant viscosity for oil 93, can be varied by varying the gap between surfaces 53 and 91. The torque transmitted from the viscous coupling from outer shell 80 to rotor 52 will be transmitted through shaft 44 to the windup spindle 34 and onto the windup roll 28.

When it is desired to adjust the torque of the clutch by varying the gap between the tapered surfaces 53 and 91 as discussed above, the bolt 84 is backed off until it is no longer in contact with the index plate 86, and the shell 80 is rotated with respect to the sleeve 72 over the threaded connection 82. Thus, by moving the shell 80 axially with respect to rotor 52, the gap between the inner surface 91 of the shell 80 and the outer surface 53 of the rotor 52 is changed, thus changing the torque capacity of the clutch. The screw 84 may then be reinserted into a selected index hole in index plate 86 and the clutch may be operated from the motor 22 at a new torque capacity.

While there have been shown and described and pointed out the fundamental novel features of the invention as applied to the disclosed preferred embodiment, it will be understood that various omissions and substitutions and changes in the form and details of the device illustrated and in its operation may be made by those skilled in the art without departing from the spirit of the invention.

What is claimed is:

1. An adjustable torque capacity fluid clutch comprising a driven shaft connectable to a load to be driven, a driven shaft support rotatably journaling said driven shaft, a rotor having a conically tapered outer surface, the rotor being fixedly secured to said driven shaft adjacent one end thereof, power input means for said clutch including a member rotatably journaled about the driven shaft, an enclosing shell having a conically tapered inner surface complementary to the conically tapered outer surface of said rotor, means mounting said shell about said rotor with said conically tapered surfaces adjacent one another, a clutch fluid contained within said enclosing shell, means drivingly connecting said shell to said member of said power input means so that said shell is driven thereby, and means threadedly connecting said shell to said power input means for adjustment of said shell axially with respect to said drive shaft and said rotor to thereby vary the distance between the tapered surfaces of said shell and said rotor thereby adjustably varying the torque capacity of said clutch.

2. An adjustable torque capacity fluid clutch comprising a driven shaft connected to a load to be rotatably driven, a driven shaft support rotatably journaling said driven shaft, a rotor having a conically tapered outer surface fixedly secured to said driven shaft adjacent one end thereof, power input means including a timing belt and timing pulley rotatably journaled about the driven shaft from said driven shaft support, an enclosing shell having a conically tapered inner surface complementary to the conically tapered outer surface of said rotor, said shell being supported from said power input means in a position to enclose said rotor with said conically tapered complementary surfaces adjacent one another, a clutch fluid carried within said enclosing shell, drive pin means drivingly connecting said shell to said timing pulley of said power input means so that said shell is directly driven at the speed of said timing input belt, and means threadedly connecting said shell to said timing pulley of said power input means so that it may be adjustably positioned with respect thereto to axially vary the position of the shell with respect to the rotor and vary the gap between the complementary tapered surfaces thus varying the torque capacity of said clutch.

3. An adjustable torque capacity fluid clutch as defined in claim 2 wherein said timing pulley includes an inner extending sleeve having a threaded inner surface and wherein said shell includes a longitudinally extending neck having a threaded outer surface for cooperating with the threaded inner surface of said sleeve and forming said threaded connection for adjustment purposes and wherein the drive pin means attached to said pulley for driving said shell cooperates with an index plate rigidly attached to said shell, the index plate having a plurality of holes therein for receiving the drive pin means.

References Cited in the file of this patent

UNITED STATES PATENTS

| | | |
|---|---|---|
| 940,970 | Hovey et al. | Nov. 23, 1909 |
| 2,070,813 | Stearns et al. | Feb. 16, 1937 |
| 2,094,095 | Collins | Sept. 28, 1937 |
| 2,519,026 | Cuttat | Aug. 15, 1950 |
| 2,812,046 | Taylor | Nov. 5, 1957 |